United States Patent
Funke et al.

(10) Patent No.: US 11,958,554 B2
(45) Date of Patent: Apr. 16, 2024

(54) STEERING CONTROL FOR VEHICLES

(71) Applicant: Zoox, Inc., Menlo Park, CA (US)

(72) Inventors: Joseph Funke, Redwood City, CA (US); Gowtham Garimella, Burlingame, CA (US); Marin Kobilarov, Mountain View, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 240 days.

(21) Appl. No.: 16/949,642

(22) Filed: Nov. 9, 2020

(65) Prior Publication Data
US 2021/0053616 A1  Feb. 25, 2021

Related U.S. Application Data

(63) Continuation of application No. 15/841,260, filed on Dec. 13, 2017, now Pat. No. 10,829,149.
(Continued)

(51) Int. Cl.
*B62D 6/00* (2006.01)
*B62D 5/04* (2006.01)
*G05D 1/00* (2006.01)

(52) U.S. Cl.
CPC .............. *B62D 6/003* (2013.01); *B62D 5/046* (2013.01); *B62D 6/001* (2013.01); *G05D 1/0088* (2013.01); *G05D 1/0221* (2013.01)

(58) Field of Classification Search
CPC ........ B62D 6/003; B62D 5/046; B62D 6/001; B62D 15/025; G05D 1/0088; G05D 1/0221; G05D 2201/0213; G05D 1/0212
(Continued)

(56) References Cited

U.S. PATENT DOCUMENTS 10,133,275 B1 * 11/2018 Kobilarov ................ G06N 3/08
10,196,086 B2 * 2/2019 Gupta .................... B62D 6/005
(Continued)

OTHER PUBLICATIONS

Gowtham et al., "Neural Network Modeling for Steering Control of an Autonomous Vehicle" (Paper TuAT7.3); 2017 IEEE/RSJ International Conference on Intelligent Robots and Systems; Sep. 24-28, 2017, Vancouver, BC, Canada.
(Continued)

*Primary Examiner* — Tyler D Paige
(74) *Attorney, Agent, or Firm* — Lee & Hayes, P.C.

(57) ABSTRACT

Model-based control of dynamical systems typically requires accurate domain-specific knowledge and specifications system components. Generally, steering actuator dynamics can be difficult to model due to, for example, an integrated power steering control module, proprietary black box controls, etc. Further, it is difficult to capture the complex interplay of non-linear interactions, such as power steering, tire forces, etc. with sufficient accuracy. To overcome this limitation, a recurring neural network can be employed to model the steering dynamics of an autonomous vehicle. The resulting model can be used to generate feedforward steering commands for embedded control. Such a neural network model can be automatically generated with less domain-specific knowledge, can predict steering dynamics more accurately, and perform comparably to a high-fidelity first principle model when used for controlling the steering system of a self-driving vehicle.

20 Claims, 6 Drawing Sheets

Related U.S. Application Data

(60) Provisional application No. 62/465,707, filed on Mar. 1, 2017.

(58) Field of Classification Search
USPC .......................................................... 701/42
See application file for complete search history.

(56) References Cited

U.S. PATENT DOCUMENTS

| | | | |
|---|---|---|---|
| 10,829,149 B1* | 11/2020 | Garimella | G05D 1/0212 |
| 2017/0142623 A1 | 5/2017 | Lindoff et al. | |
| 2018/0043931 A1* | 2/2018 | Gupta | B62D 11/02 |
| 2018/0081362 A1* | 3/2018 | Linke | G08G 1/0129 |
| 2018/0120843 A1 | 5/2018 | Berntorp et al. | |
| 2018/0152855 A1 | 5/2018 | Lindoff | |
| 2018/0173240 A1* | 6/2018 | Fang | B60W 60/0027 |
| 2019/0361439 A1 | 11/2019 | Zeng et al. | |
| 2019/0361456 A1 | 11/2019 | Zeng et al. | |
| 2020/0110416 A1* | 4/2020 | Hong | G01C 21/3602 |
| 2020/0139967 A1* | 5/2020 | Beller | G05D 1/0223 |

OTHER PUBLICATIONS

Non Final Office Action dated Jan. 30, 2020 for U.S. Appl. No. 15/841,260 "Steering Control for Vehicles" Garimella, 20 pages.

\* cited by examiner

STEERING CONTROL FOR VEHICLES

CROSS-REFERENCE TO RELATED APPLICATION

This application is a continuation of and claims priority to U.S. application Ser. No. 15/841,260, filed on Dec. 13, 2017 and entitled "STEERING CONTROL FOR VEHICLES," which is a non-provisional of and claims priority to U.S. Provisional Application No. 62/465,707, filed Mar. 1, 2017, the entirety of which are incorporated by reference herein.

BACKGROUND

Various autonomous vehicles systems rely on models of the physical environment in order to provide navigation and control. Such model-based control of dynamic systems typically requires accurate domain-specific knowledge and specifications of possibly proprietary system components. In the context of autonomous driving, for instance, steering actuator dynamics can be difficult to model due to an integrated proprietary power steering control module. While first-principles models derived from physics laws could often approximate the system behavior, it remains generally difficult to capture the complex interplay of power steering and tire forces with sufficient accuracy.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1A:
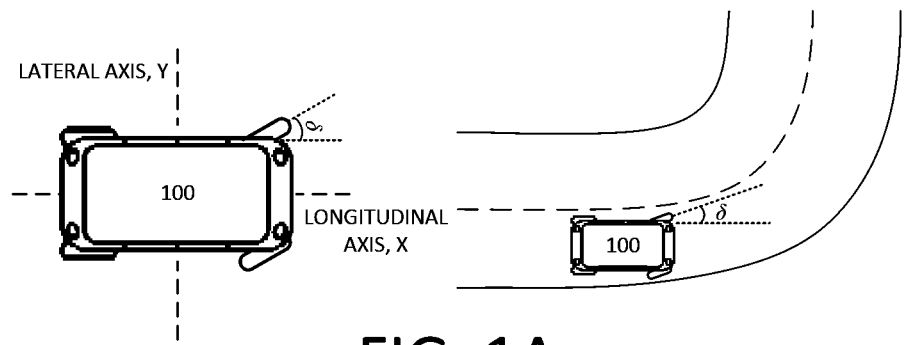
FIG. 1A illustrates an aerial view of an example vehicle, the steering system of which is controlled by the example steering system control architecture discussed herein.

This disclosure is generally directed to techniques (e.g., machines, processes) for model-based control of steering for a vehicle. In some examples, the techniques discussed herein may include controlling a vehicle's steering using model-based control, such as model-predictive-control (MPC), for example. In some examples, the techniques discussed herein may include controlling an autonomous vehicle's steering using a predictive model integrated into an MPC framework, where the predictive model comprises both a physics function and a machine learned (ML) model that generates a feedforward steering control command for embedded control. A paper entitled "Neural Network Modeling for Steering Control of an Autonomous Vehicle" by Gowtham Garimella, Joseph Funke, Chuang Wang, and Marin Kobilarov, as can be found in the provisional application, is incorporated herein by reference, in its entirety.

A first-principles (FP) model may be configured to model the steering system of the vehicle using first principles of physics and/or mathematics, such as modeling the steering system as a second-order forced dynamical system. Thereby, the FP model may predict how the steering system of the vehicle should respond to a torque applied to the steering system according to the first principles with which the model is configured—for example, predicting the steering angle, steering rate, and/or forward velocity that results from a torque applied to the steering system—and may thereby determine a steering torque to apply to the vehicle steering assembly.

Although the FP model may be sufficient to determine an approximate theoretical torque to supply to the steering system to achieve a desired steering angle, a desired steering rate, and/or a desired longitudinal velocity (all corresponding to a desired trajectory), in some examples, the dynamics of the steering system may deviate from the FP model's prediction. The FP model may not account for residual dynamics such as lateral dynamics, effects of road-tire interactions, proprietary power steering logic, peculiar steering system dynamics.

For example, where only an FP model is used, the steering torque determined by the FP model may be transmitted to a steering controller, such as, for example, an embedded proportional-integral-derivative controller (PID controller), which in turn may govern a steering actuator (e.g., power-steering motor) to track the steering torque. However, the steering torque generated by the FP model, alone, may not ultimately cause the steering actuator to apply a torque that accurately achieves the desired steering angle, desired steering rate, and/or desired longitudinal velocity due to unaccounted-for road-tire interactions, proprietary information of the PID controller and/or proprietary information of the steering actuator (e.g., power steering logic), and/or design or condition variations of the particular steering system.

The predictive model discussed herein that includes the physics function and ML model improves the accuracy of the achieved steering angle, steering rate, and forward instead of using the FP model to determine the torque to apply to the vehicle steering assembly.

In some examples, the predictive model discussed herein may include an MPC or Nonlinear Model Predictive Control (NMPC) system where the next (predicted) states of the system are defined by a predictive model that includes an ML model and a physics function. The ML model and the physics function may thereby function as a transition function of the MPC or NMPC system. The physics function may model the linear kinematics of a vehicle's steering system and the ML model may model the nonlinear residual dynamics of the vehicle's steering system, such as lateral dynamics of the system, effects of road-tire interactions, proprietary power steering logic, and/or steering system dynamics peculiar to a particular steering system, for example. In some examples, the physics function and/or the ML model may predict the dynamics of the steering system in discrete time, i.e., at time steps of a determined length of time (e.g., in increments of 0.1 seconds, for example and without limitation).

In some examples, the physics function and the ML model may receive a current state of the steering system (e.g., current steering angle, steering rate, yaw, and lateral velocity measured by sensors of the system or provided by a former block of the predictive model or a previous output of the predictive model) and current controls applied to the system (e.g., applied steering torque, longitudinal velocity) to determine a predicted state (e.g., predicted steering angle, steering rate, yaw, and/or lateral velocity). The predicted state may be a next state (e.g., predicted state of the steering machine 0.5 seconds in the future, or 3 milliseconds in the future, depending on pre-determined block size) and/or any of the next N number of states (e.g., predicted state of the steering machine 0.5 seconds, 1 second, and 1.5 seconds in the future for next three states, in one example). Of course, any period of time for prediction or any number of states are contemplated herein. The predicted state determined by the physics function and/or the ML model may be used to conduct an NMPC optimization to determine a feed-forward control command to sum to an output of a PID controller. The feed-forward control command is configured to improve the PID controller output by accounting for nonlinear dynamics of the system. This increases the accuracy of the steering angle, steering rate, and/or forward velocity of the steering system, thereby increasing the safety and predictability of operation of the vehicle configured with this system. For example, this technique may increase the safety of an autonomous vehicle.

In an example of the techniques discussed herein that employs a predictive model that includes both a physics function and an ML model, the physics function and the ML model may each be configured to model dynamics of the steering system of an autonomous vehicle. In some examples, the physics function and the ML model may model different dynamics in the steering system. For example, the physics function may model a no-slip condition for a kinematic car model, for example by modeling a simple linear kinematics function, and the ML model may predict the residual dynamics not modeled by the physics function such as the lateral dynamics, effects of road-tire interactions, steering system logic, and/or other steering system variations from theoretical first-principles behavior.

In some examples, the physics function may determine a linear component of the predicted state and this component may be subtracted from or otherwise accounted for an input to the ML model. In other words, the ML model may be configured to account for a nonlinear component of the predicted state (e.g., lateral dynamics, power steering logic) and the physics function may be configured to account for a linear component of the predicted state.

In some examples of the techniques discussed herein, the ML model may be an artificial neural network including one or more layers. Machine learning generally refers to a broad class of algorithms in which an output is generated based on learned parameters, which will be discussed in detail below. In some examples, one machine learning algorithm that may be used for the ML model is a recurrent neural network (RNN). In some examples, to improve its predictive capacity, such a model may be augmented with known physics-based transition blocks (e.g., the physics function discussed herein). Such a learned model may then be employed in an MPC framework to produce the feed-forward control torques for a low-level embedded steering PID controller. The architecture for such an RNN which will be discussed in detail below.

In some examples, the predictive model includes one or more blocks of the ML model and physics function. An individual block may include a physics function and an ML model (e.g., layers of an artificial network). The individual block may determine the predicted state for a specific time step (e.g., the predicted state two time steps in the future, which may be the predicted state at "+0.2 seconds" in a system where a discrete time step is defined to be 0.1 seconds) and may i) output this predicted state to a next block (e.g., a block determining the predicted state three time steps into the future), ii) recur this predicted state as an input into the same block that determined the predicted state, and/or may output this predicted state to an MPC optimizer that conducts the MPC optimization to determine the feed-forward control torque. The predictive model may include multiple blocks, so-configured, where the multiple blocks may be stacked in time out to a horizon (e.g., a first block may predict the steering system state at 0.1 seconds in the future, which is used by a second block to predict the steering system state at 0.2 seconds, and so on until the horizon time, such as 2 seconds, for example and without limitation).

For example, for predictive model configured to predict the discrete states of the steering system out to a horizon time of 2 seconds at an interval of 0.1 seconds, the predictive model may include 20 blocks. A number of layers of the neural network may also correspond to the horizon time and interval (e.g., 4 layers for a horizon time of 2 seconds at an interval of 0.5 seconds).

The predictive model configured with the physics function and ML model, as discussed further herein, markedly increases the accuracy of predicting steering dynamics over traditional techniques, such as only using a PID controller and/or using an FP model, thereby increasing the accuracy which an autonomous vehicle may be controlled and increasing safety of operation of an autonomous vehicle. Moreover, the techniques discussed herein obviates the need to obtain electro-mechanical specifications of proprietary black-box (e.g., third-party OEM) vehicle systems. It is contemplated that this concept may be more broadly applied to other instances of model-predictive-control that includes a black-box component. It is also contemplated that the techniques discussed herein need not be limited to black-box components, but may increase the accuracy of control for systems with known electro-mechanical specifications. Further, although discussed in the context of autonomous vehicles, the techniques discussed herein can be applied to any vehicle type and/or control system that governs a dynamic physical system, and is not limited to steering systems.

Example Steering System Control Architecture

FIG. 1A illustrates an aerial view of an example vehicle 100, the steering system of which is controlled by the example steering system control architecture discussed herein. FIG. 1A depicts a steering angle, δ, of a steering system of the vehicle 100. Other dynamics that are not represented in the figure may include a yaw of the vehicle 10, φ; steering rate δ (i.e., angle change of a wheel per time); longitudinal velocity along the longitudinal axis, $v_x$; lateral velocity along the lateral axis, $v_y$; and torque applied to the vehicle steering assembly, $\tau_s$, to cause rotation of wheel(s) of thesteering system.

Figure 1B:
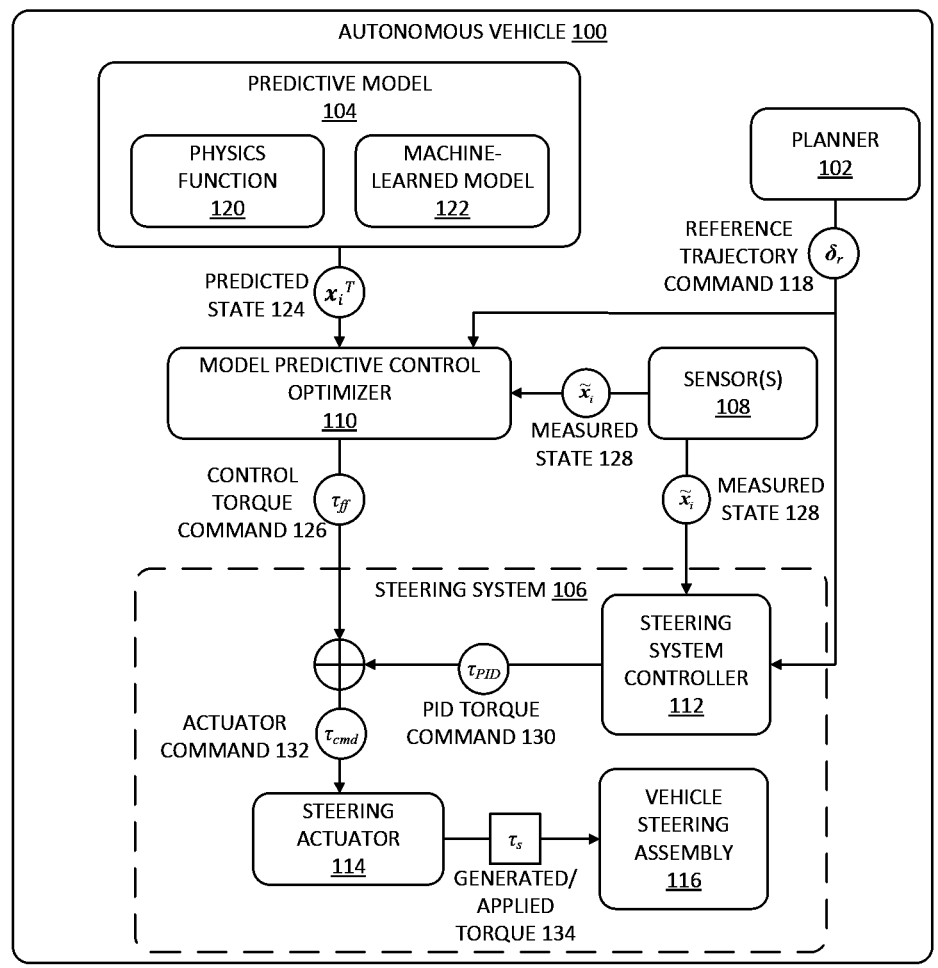
FIG. 1B illustrates a block diagram of an example steering system control architecture for controlling a steering system of a vehicle according to a reference trajectory.

FIG. 1 illustrates a block diagram of an example vehicle 100 that includes an example planner 102, example predictive model 104 configured according to the techniques discussed herein, and an example steering system 106 of the example vehicle 100, as well as and inputs and outputs associated with those components. In some examples, the vehicle 100 may further include sensor(s) 108. The example steering system 106 may include one or more components that are configured to receive commands from the planner 102, the predictive model 104, and/or a MPC optimizer 110 and cause a torque to be exerted upon vehicle steering assembly of the autonomous vehicle 100, as discussed in more detail below. For example, the steering system 106 may include a steering system controller 110 that receives commands from the planner 102 and/or the MPC optimizer 110 and generates commands for a steering actuator 114 that exerts torque on vehicle steering assembly 116 to vary a steering angle, steering rate, or revolution velocity of a wheel, for example. The steering system controller 110 and/or the steering actuator 114 may also receive sensor data from the sensor(s) 108.

In some examples, the sensor(s) 108 may include, but are not limited to, one or more of lidar sensors, RADAR sensors, SONAR sensors, image sensors, ultrasonic transducers, wheel encoders, microphones, inertial measurement unit(s) (IMU), accelerometers, gyroscopes, magnetometers, temperature sensors, humidity sensors, light sensors, global positioning system (GPS) sensors, etc.

The vehicle steering assembly 116 may include a wheel and linkages for translating torque applied by the steering actuator 114 to variations in the steering angle, steering rate, and/or rotational velocity of the wheel. For example, the linkage may include a steering box, drop arm, idler arm, and/or steering rack. In some examples, the orientation and function of the wheels of the vehicle may be independently actuated by electro-mechanical motors at each of the wheels in an electric vehicle.

In some examples, the vehicle 100 may include an autonomous vehicle such as, for example, an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time.

The planner 102 of the vehicle 100 may include instructions stored on a memory that, when executed by processor (s), configure the processor(s) to generate data representative of a trajectory of the autonomous vehicle 100, for example, using data representing a location of the autonomous vehicle 100 in its environment and other data, such as local pose data. In some examples, the trajectory may include a position to which the autonomous vehicle desires to move. In some examples, the planner 102 may also be configured to determine projected trajectories predicted to be executed by the autonomous vehicle 100. In some examples, the planner 102 may substantially continuously (e.g., every 1 or 2 milliseconds) generate a plurality of potential trajectories with which to control the autonomous vehicle 100, and may select one of the trajectories with which to control the vehicle. The selection may be based at least in part on a current route, a drive mode, current vehicle trajectory, and/or object trajectory data. Upon selecting a trajectory, the planner 102 may transmit the selected trajectory to the predictive model 104 and/or the steering system 106, as a reference trajectory command 118, to control the autonomous vehicle 100 according to the selected trajectory. In some examples, the planner 102 may conduct an MPC optimization of a selected position trajectory to determine the reference trajectory command 118. In some examples, the planner 102 may include an MPC system for determining the reference trajectory command 118 or the MPC system for determining the reference trajectory command 118 may be separate from the planner 102 and the MPC optimizer 110.

The reference trajectory command 118, $\delta_r$, may include a command for the steering system 106 to accomplish a desired steering angle, $\delta_r$; a desired steering rate, $\dot{\delta}_r$; and/or a desired longitudinal velocity of the vehicle, $v_{x_r}$, where the longitude is defined by an axis of the autonomous vehicle 100 that is substantially parallel to the reference trajectory command. Note that, although FIG. 1A depicts the longitudinal axis as being along the x-axis, the autonomous vehicle 100 may be equipped to drive laterally, thereby re-orienting the "longitudinal" axis as being the y-axis. The planner 102 may transmit the reference trajectory command 118 to the predictive model 104 and/or the steering system 106 so that the predictive model 104 and/or the steering system 106 may generate commands for the remaining portions of the steering system 106 to accomplish the desired trajectory.

The predictive model 104 may include a physics function 120 and/or an ML model 122. In some examples, the predictive model 104 may receive the reference trajectory command 118 and determine a predicted state 124, $x_t^T$, of the steering system from a reference trajectory command 118. The predictive model 104 may serve as a transition function that predicts the next state of the system for a model-predictive control system.

The MPC optimizer 110 may include an MPC or NMPC system that uses the predicted state 124 of the system to determine a control torque command 126 (e.g., a feed-forward control torque command) by an MPC or NMPC optimization, as discussed in more detail below. In some examples, the predictive model 104 may include more or less components.

In other words, the predictive model 104 may receive a desired trajectory (i.e., the reference trajectory command 118) that may specify a desired steering angle, desired steering rate, and/or desired longitudinal velocity. The predictive model 104 may output a predicted state 124 made by the physics function 120 and/or the ML model 122. The predictive model 104 may provide the predicted state 124 to the MPC optimizer 110, which may determine a control torque command 126. The MPC optimizer 110 may transmit the control torque command 126 to the steering system 106 of the vehicle 100 to achieve the desired steering angle, desired steering rate, and/or desired forward velocity to achieve a resultant trajectory that corresponds to the desired trajectory.

In some examples, the physics function 120 and/or the ML model 122 may determine predicted responses (also termed "propagated states" or "predicted states," herein) of the steering system 106 to a torque applied to the steering system 106 and/or longitudinal velocity of the vehicle 100. Where the predictive model includes both an physics function 120 and an ML model 122, the physics function 120 may be a nominal physics-based model that may be embedded as a component of a block inside a data-driven recurrent neural network (RNN) (which also includes the ML model 122), which may serve as a transition function for an MPC system. In some examples, the physics function 120 may be modeled based on known physics laws from first principles. In some examples, the steering dynamics can be modeled as a linear kinematic function and/or a second-order forced dynamical system with torque inputs induced by a steering actuator and tire forces.

For example, the predicted state 124 determined by the physics function 120 and/or the ML model 122 may include the steering angle, $\delta$; steering rate, $\dot{\delta}$; yaw rate, $\phi$; and/or the lateral velocity, $v_y$; based at least in part on the applied steering torque $\tau_s$ and/or the longitudinal velocity, $v_x$. This determination may be dependent on the lateral dynamics of the vehicle 100, which may be, in turn, dependent on the longitudinal velocity $v_x$ of the vehicle 100. In some examples, the lateral components of the steering dynamics of the vehicle, for example, the lateral velocity $v_y$ and/or yaw rate $\dot\phi$ of the vehicle, may be predicted as a part of the steering dynamics.

The complete state of the steering dynamics may be represented by $x=[\delta,\dot\delta,\phi, v_y]^T$ and controls by $u=[\tau_s, v_x]^T$. Together, the stacked states and controls may be represented by $z=[x^T, u^T]^T$ In some examples, the physics function 120 and/or the ML model 122 may be configured to determine the next state at a next time step of the steering dynamics, $x_{i+1}$, from the stacked current states and current controls, $z_i=[x_i^T, u_i^T]^T$, such that the discrete steering dynamics at a next time step may be stated as $x_{i+1}=f(z_i)$ with i representing the index along the trajectory. The predictive model 104 may predict the next state $x_{i+1}$ given the current state $x_i$ and control $u_i$. Similarly, the predictive model 104 may predict the state of the steering system two time steps in the future, $x_{i+2}$, given the predicted state $x_{i+1}$ and controls $u_{i+1}$. In some examples, the predicted state 124, $x_i^T$, includes predicted states at one or more time steps. In one example, the predicted state 124, $x_i^T$, includes all the predicted states of the steering system from the current time step to a prediction horizon. In another example, the predicted state 124, $x_i^T$, includes all the predicted states of the steering system from a next time step to a prediction horizon. The state transition function $f$ is an unknown nonlinear function of the previous state and controls. It can be described using a first principles approach and/or using a non-parametric model such as neural networks.

In some examples, the current state (or at least one of the dynamics, such as the lateral velocity), $x_i$, and/or the current controls, $u_i$, input into the physics function 120 and the ML model 122, may be set to equal a measured state 128, $\tilde x_i$, determined by the sensor(s) 108, to initialize the first block that does not receive a prediction from a prior block. For example, a sensor may measure 116a steering angle from one or more encoders or modules aboard the vehicle 102, determine a yaw rate and/or lateral velocity from one or more localization algorithms using data from the sensor(s) 108, and the like. Additionally, or alternatively, current state and/or the current controls may be initialized randomly at a $0^{th}$ state when no control commands have yet been transmitted to the steering system. Additionally, or alternatively, the current controls may be transmitted to the predictive model 104 by a component of the steering system such as, for example, the steering system controller 110 and/or the steering actuator 114.

The ML model 122 may be configured to model the steering dynamics of the autonomous vehicle according to learned parameters learned from observing control torques transmitted to the steering system and the resultant steering parameters, as discussed in more detail below. In some examples, the predictive model may sum, concatenate, combine, aggregate, and/or otherwise amalgamate the outputs of the physics function and the ML model to determine the predicted state, where the physics function and the ML model determine different dynamics of the steering system that contribute to the predicted state.

In some examples, the MPC optimizer 122 determines a control torque command 126, such as a feedforward steering torque, $\tau_{ff}$, using the predicted state 124 of the steering system, $x_{i_j}^T$, determined by the predictive model 104. For example, the MPC optimizer 110 may determine the feedforward steering torque, $\tau_{ff}$, by solving an NMPC optimization problem, as discussed in more detail below.

Once the MPC optimizer 110 determines the control torque command 126 (i.e., feedforward steering torque, $\tau_{ff}$), the MPC optimizer 122 may transmit the control torque command 126 to the steering system 106. In some examples, the MPC optimizer 122 may transmit the control torque command 126 to a steering system controller 110.

In some examples, the steering system controller 112 may include a PID (proportional-integral-derivative) controller. The steering system controller 112 may be configured to track the reference trajectory 118, $\delta_r$, by generating a PID steering torque command 130, $\tau_{PID}$, according to PID techniques. In some examples, the control torque command 126 (feedforward steering torque, $\tau_{ff}$) may be summed to the PID steering torque command 130, $\tau_{PID}$, to form an actuator command 132, which is transmitted to steering actuator 114. In some examples, the feedforward steering torque, $\tau_{ff}$, generated by the MPC optimizer 110, may be configured to compensate for nonlinearities of the steering system 106 to thereby improve tracking performance of the PID controller when compared to applying a torque determined by a PID controller alone. An example is described in detail below. In some examples, the PID controller may track the reference trajectory, $\delta_r$, by commanding the PID steering torque, $\tau_{PID}$, as:

$$\tau_{PID}=-k_p(\delta-\delta_r)-k_d(\dot\delta-\dot\delta_r)-k_i e_\delta$$

$$e_\delta=\Sigma(\delta-\tilde\delta),$$

$$e_{v_x}=\Sigma(v_x-\tilde v_x)$$

where $\tilde v_x$ is a measured longitudinal velocity and $\tilde\delta$ is a measured steering angle obtained the sensor(s) 108. In some examples, control torque command 126 (the feedforward steering torque) may be summed with the PID steering torque command to form the actuator command 132 as follows:

$$\tau_{cmd}=\tau_{PID}+\tau_{ff}$$

In some examples, the steering actuator 114 receives the actuator command 132 and generates therefrom a physical torque 134, $\tau_s$, that is applied to the vehicle steering assembly 116. This applied torque 134 causes wheel(s) of the vehicle 100 to turn and/or rotate, thereby producing a resultant steering angle, resultant steering rate, and resultant longitudinal velocity. In some examples, the steering actuator 114 may be a power steering motor governed by a steering controller (e.g., a PID controller of the steering system controller 110).

Example Predictive Model

Figure 2:
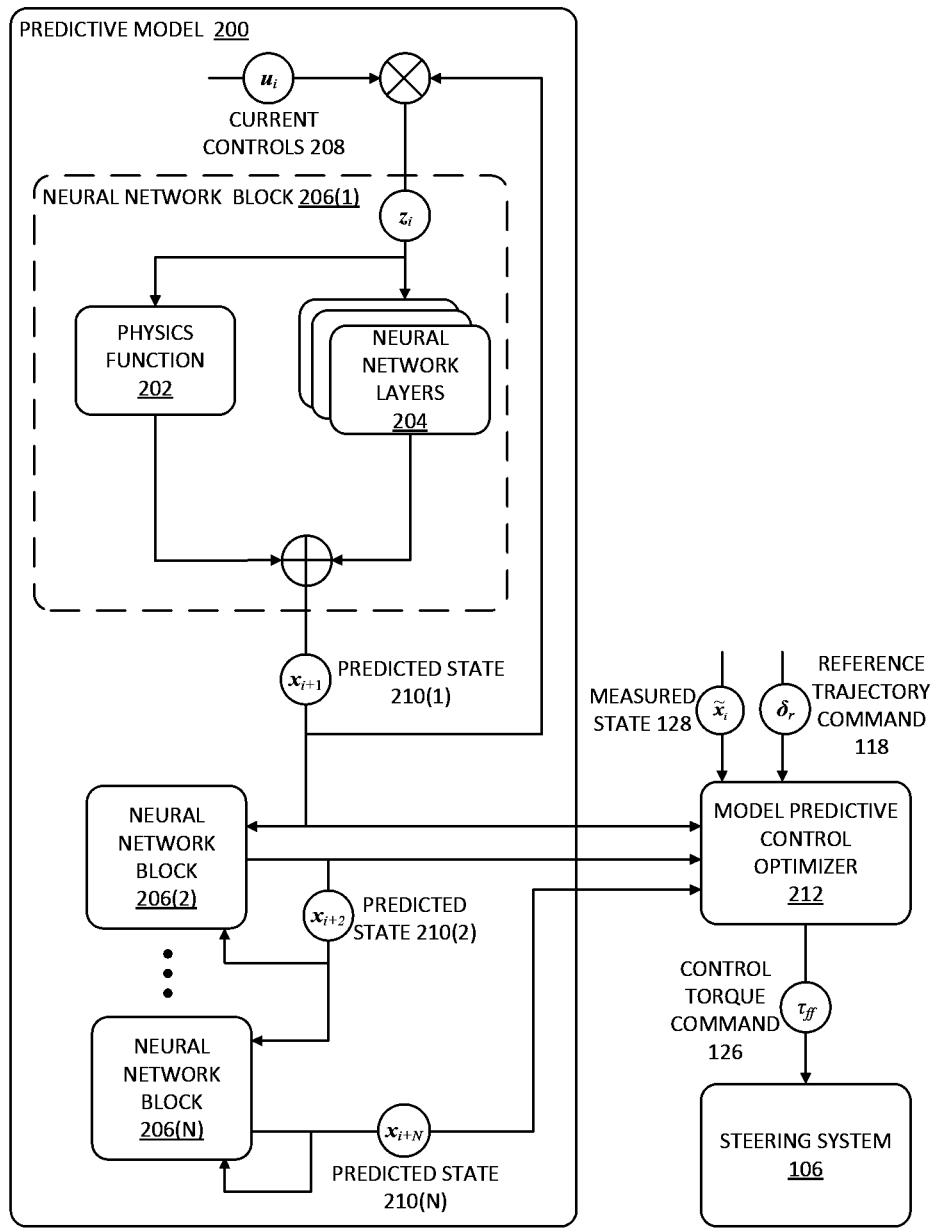
FIG. 2 illustrates an example neural network architecture that compensates for nonlinearities in the steering system to improve tracking performance.

FIG. 2 illustrates an example predictive model 200 and its operations. The predictive model 200 may correspond to the predictive model 104 of FIG. 1 and may include a neural network that includes a physics function 202 that may correspond to the physics function 120 and includes neural network layers 204 that may correspond to the ML model 122. The predictive model 200 may receive the reference trajectory command 118 from the planner 102.

For comparison to the physics function 202 of the predictive model 200, an FP model may be a second order model that integrates a net steering torque to steering angle and rate. The net steering torque may be given by a combination of steering system dynamics, road wheel interactions, and power steering torque. Such steering system dynamics may comprise Coulomb friction from steering rack, jacking torque due to camber angle, and damping caused by rigid body dynamics. The self-aligning torque may be produced due to tire deformation when the steering wheel moves against the tire thread. In some instances, at low slip angles, the self-aligning torque may be proportional to the lateral force $F_{yf}$ applied at a front tire.

Such a resulting first principles model can be written as:

$$\ddot{\delta} = \underbrace{k_p \delta}_{jacking} + \underbrace{k_d \dot{\delta}}_{damping} + \underbrace{k_a F_{yf}}_{Aligning} + \underbrace{k_c \text{sgn}(\dot{\delta})}_{Coloumb} + \underbrace{g(\tau_{in}, v_x) \tau_{in}}_{PowerSteering}$$

$$\text{where sgn}(\dot{\delta}) = \begin{cases} 1 & \text{if } \dot{\delta} < 0 \\ -1 & \text{otherwise} \end{cases}.$$

In some examples, the FP model may further include a tire model that determines the lateral force applied on a "front" (as referenced by a direction of the trajectory or the vehicle) tire of the vehicle. The FP model may further include a bicycle model to predict the lateral velocity, $v_y$, and/or yaw rate, $\phi$. That is, a vehicle having any number of wheels or axes can be represented as a vehicle having two wheels to predict the lateral velocity and/or yaw, hence the bicycle model. The FP model may also include a power steering model that models the steering actuator using a gain that is based on the torque command supplied to the steering actuator and the longitudinal velocity, as follows:

$$g(\tau_{in}, v_x) = k_1 g_1(\tau_{in}) g_2(v),$$

$$g_1(\tau_{in}) = \left[ 1 - e^{-\left(\frac{\tau_{in} - k_2}{k_3}\right)^2} \right],$$

$$g_2(v) = [k_4 + (1 - k_4) e^{-v_x/k_5}].$$

The first gain (e.g., $g_1$) is dependent on input torque applied to the steering system. It increases with the input torque and saturates to a constant value $k_1$ as input torque becomes large. The second gain (e.g., $g_2$) decreases with vehicle longitudinal velocity until it saturates to a constant value $k_4$. In some examples, such a form of the gain function may be chosen based on observed experimental data between driver input torque and assist torque. Unknown parameters in the FP function 202 may then be obtained by least squares fitting between the control inputs and measured steering angle and steering rate.

In some examples, the predictive model 200 depicted in FIG. 2 is a neural network model (or any other non-parametric model) that may predict next state(s) of the steering system according to a nonlinear function $f$ in discrete steering dynamics $x_{i+1} = f(z_i)$. Such a model may include one or more units of neural network blocks (206 (1)-(N)) stacked in discrete time (depicted as 1 through N blocks in FIG. 2). Each neural network block may be further divided into a physics function 202 and a stack of fully connected layers 204.

Example Neural Network Architecture

FIG. 2 further shows an example architecture of such a neural network block 206(1). It is understood that the discussion of the neural network block 206(1) may be iterated for subsequent blocks of the neural network, where the example includes multiple neural network blocks. In some examples, current controls 208, $u_i^T$, and previous outputs (the previously predicted state 210), $x_{i+1}$, are input into the neural network block 206(1). Note that the controls 208 (e.g. a torque input and/or a longitudinal velocity) and predicted state 210 (e.g. steering angle, steering angle rate, lateral velocity and/or yaw rate) may be initialized for the first block since, in some examples, no controls and/or previous state may be known. In some examples, these inputs may be initialized using random parameters for the first block corresponding to a first time step. In some examples, these inputs (or at least the previously predicted state) may be initialized by setting the input current state to equal a measured state 128. Note that, as referred to herein, in some examples, the neural network block may recur its own output predicted state as an input this is referred to herein as a previously predicted state and/or as a current state, when it is being discussed as an input.

In some examples, the current controls 208 and the previously predicted (i.e., current) state 210(1) may be stacked together (e.g., concatenated) as a stacked state and controls, $z_i$, and fed into the neural network layers 204 and the physics function 202. In some examples, the neural network layers comprise one or more (e.g. two, three, or more) fully connected layers. In some examples, the number of fully connected layers may correspond to a number of steps from a current state to a prediction horizon (e.g., 4 layers for a prediction horizon of 2 seconds where each step is an interval of 0.5 seconds).

In some examples, the neural network block 206(1) pushes the stacked state and controls, $z_i$, through the physics function 202 and the neural network layers 204 to achieve an output of the physics function 202 and an output of the neural network layers 204, which may be added together to form the predicted state 210 at a subsequent step. In some examples, the output of the physics function 202 may be subtracted from an input to the neural network layers 204 or may otherwise account for an estimate of the linear component of the steering dynamics so that the neural network layers 204 may predict the nonlinear component of the steering dynamics. In the example shown, the predicted state 210(1) predicted by the neural network block 206(1) includes a predicted state of the steering system at "+1" discrete steps from the current step in the trajectory. Similarly, subsequent network blocks (e.g., 206(2)-206(N)) may predict the states of the steering system at "+2" discrete steps from the current step in the trajectory and so on up to the number of steps, N, needed to reach the prediction horizon.

Such predicted states, together with new control inputs, may be fed back into the network. In additional or alternative examples, the network block 206(1) may pass the predicted state 210(1) to a subsequent block (i.e., neural network block 206(2)) to be used by the subsequent block as the current state from which the subsequent block determines a subsequent predicted state (i.e., predicted state 210(2), $x_{i+2}$. In other words, a state at a first time step predicted by a first neural network block may be used by a second network block as an input current state to determine a second state at a second time step that is subsequent to the first time step.

FIG. 2 further depicts neural network blocks 206(2) and 206(N) that may function similarly to neural network block 206(1) in predicting a predicted state 210(2) and 210(N), respectively, of the steering system at "+2" and "+N" steps from the current step in the trajectory. The predictive model 200 may comprise any number of such blocks to compose time steps up to a prediction horizon (e.g., number of blocks may correspond to a horizon time or number of steps of prediction).

For example, if each step represents a 0.1 second interval and the prediction horizon is 2 seconds, then there may be 20 steps and, accordingly 20 neural network blocks. In some examples, only the final neural network block, 206(N) (i.e., the neural network block that predicts the last step that corresponds to the horizon time) may transmit the predicted state 210(N) predicted by the final neural network block 206(N) to an MPC optimizer 212. In some examples, all or a subset of the neural network blocks 206(1)-(N) may transmit the predicted states 210 determined by the neural network blocks 206(1)-(N) to the MPC optimizer 212.

In general, the overall discrete dynamics for a neural network block 206(1) may be written as $x_{i+1} = f_{ph}(z_i) + f_{nn}(z_i)$, where $f_{ph}$ denotes the physics function 202 and $f_{nn}$ represents the neural network layers 204. In some examples, the physics function 202 incorporates basic domain knowledge by predicting the steering angle as an integral of the steering rate and the yaw rate based on the no-slip condition for a kinematic vehicle model. In some examples, the physics function 202 may determine a component of the predicted state 210(1) (i.e., the component of the steering dynamics attributable to linear dynamics) as:

$$f_{ph}(z_i) = \begin{bmatrix} \delta_i + k_1 \dot{\delta}_i \\ 0 \\ v_{x_i} \tan(k_2 \delta_i) \\ 0 \end{bmatrix}$$

where the unknown parameters are the time step for integration, $k_1$, and the inverse of the wheelbase of the vehicle, $k_2$. Similarly, the neural network layers 204 may be written as:

$$f_{nn}(z_i) = g_n(g_{n-1}(g_{n-2}(\ldots g_0(z_i)))),$$

$$g_i(x) := \sigma(W_i x + b_i) \text{ for } i \in [0, n),$$

$$g_n(x) := W_n x + b_n$$

In some examples, the function $g_i(\cdot)$ may define a single fully connected layer for the neural network with parameters $W_i$, $b_i$. In those examples, the function $\sigma(\cdot)$ may denote an activation function used in the network. In some examples, the activation function may be chosen to be the hyperbolic tangent (tanh) function, although any other suitable activation function may be chosen (e.g. ReLU, Sigmoid, and the like). A last layer, $g_n(\cdot)$, may be specified which may or may not comprise such an activation function, in those examples where the neural network is used in an RNN. In other examples, the last layer may include an activation function.

Such neural network layers 204, as described above, may predict residual dynamics not modeled by the physics function 202. The neural network layers 204 therefore may capture effects of the lateral dynamics, road-tire interactions, power steering logic, and peculiar steering system dynamics, though other effects may be included as well. In some examples, the component determined by the physics function 202 may be subtracted from an input to the neural network layers 204. In some examples, an addition of the physics function in the neural network block 206(1) may improve the gradient flow of the neural network, thereby providing better prediction performance and reducing processing requirements and memory requirements. In some examples, the increase in depth of the fully connected layers increases the ability of the RNN (i.e. e.g., the neural network block(s) 206) to model higher nonlinear models.

Example Neural Network Training

In general, a neural network must be trained. Training entails generating various internal parameters based on expected outcomes. In some examples, neural network weights of the neural network layers 204 and physics function 202 parameters may be optimized using time series data collected from driving a vehicle along variable curvature paths with different desired longitudinal velocities. In such examples, the vehicle states may be recorded in addition to the actual (measured) response of the vehicle. As such, a cost may be calculated between the desired response and the actual (measured) response and back-propagated through the layers to determine weights and biases. In some examples, the steering dynamics are controlled using a preliminary PID controller during the data collection phase.

In some examples, the collected time series data may be divided into fixed time horizon segments to train the neural network model. In some examples, these segments may be discretely represented using the steps discussed herein and, in examples where the neural network includes multiple neural network blocks, the number of blocks may correspond to a number of segments that corresponds to a segment horizon in time (e.g., where the prediction/segment horizon is 0.5 seconds and the segments correspond to 0.1 seconds, the number of neural network blocks may be five). In some examples, a loss function during neural network training may be set to minimize the difference between propagated states and measured states for each of the fixed time horizon segments. Additionally, or alternatively, the loss function may also add an L2 regularization with a user selected gain $c_r$ to avoid overfitting of the parameters. The goal of the training phase may be to find the optimal parameters $\theta^*$ that minimize the training cost as:

$$\theta^* = \operatorname{argmin}_\theta \sum_{j=1}^m C(\tilde{x}_{0:N}, u_{0:N-1}, \theta),$$

$$C(\tilde{x}_{0:N}, u_{0:N-1}, \theta) = \sum_{i=1}^n (\tilde{x}_i - x_i)^T P(\tilde{x}_i - x_i) + c_r \theta^T \theta,$$

$$\text{s.t. } x_{i+1} = f_{ph}(z_i, \theta) + f_{nn}(z_i, \theta),$$

$$z_i = [x_i, u_i], \quad x_0 = \tilde{x}_0,$$

$$\theta = [W_0, b_0, W_1, b_1, \ldots, W_n, b_n, k_1, k_2]$$

where $\theta$ denotes the weights of the network along with the unknown physics parameters, $\tilde{x}_{0:N}$ denotes the measured system states from step 0 to N (taken from collected time series data converted to discrete time), and $u_{0:N-1}$ denotes the controls input to the steering system at steps 0 to N−1.

As denoted above, such a cost function, C, measures the deviation of the propagated states $x_i$ from measured states $\tilde{x}_i$ for m sample trajectories. In some examples, the state deviations may be weighed using a diagonal matrix, P, to enforce a uniform scale across the deviations. In those examples, P may be chosen as the inverse covariance of the sensor(s) 108 measurements. In some examples, the initial predicted system state, $x_0$, may be initialized as the system state measured by sensor(s) 108, $\tilde{x}_0$.

In some examples, the training optimization may be performed in two stages: first, by limiting the propagation to a single step; and, second, initializing the parameters obtained from a previous stage and optimizing over the entire trajectory segment.

In some examples, to train the neural network, training data may be provided to the training optimization to find the optimal parameters, $\theta^*$, discussed above. For example, $2^4$ trajectory segments with a 0.5 second horizon may be provided to the training optimization, though any number of segments and horizon times are contemplated. Such training data may correspond to approximately 150 hours of driving data. In some examples, the neural network layers 204 may be trained with two fully connected layers. Additionally, or alternatively, the neural network layers 204 may include one or three or more fully connected layers. In some examples, training optimization may be performed using mini-batch gradient descent with a batch size of 200 samples, though any number of samples is contemplated.

In some examples, the optimal parameters found after providing the training data to the functions may be used to verify the performance of the model on a test data set of $5^3$ trajectory segments. In some examples, the neural network layers 204 may be used to propagate (predict by pushing through the neural network layers) the lateral dynamics using the initial state and controls along the trajectory. In some examples, an addition of a second layer to the neural network layers 204 along with the physics function 202 may improve the performance of prediction significantly, though any number of additional layers is contemplated. In some examples, no more than two layers are used.

Example Steering Control

Once the predictive model 200 has determined the predicted states 210 ($\tilde{x}_{i+(1,N)}$), the predictive model 200 may transmit any of the predicted states 210 to an MPC optimizer 212 to determine a control torque command 126 to transmit to the steering system 106. In some examples, the MPC optimizer 212 may do so by using the predicted states 210 to solve an MPC problem. In some examples, the MPC optimizer 212 may determine a feedforward control torque as the control torque command 126. In some examples, the MPC optimizer 212 may convert the feedforward control torque to a command (the control torque command 126) in a format useable by a downstream steering system device (e.g., to a PID controller). For example, the MPC optimizer 212 may determine a numerical representation of a feedforward steering torque and convert that representation to a machine command that would cause a PID controller to output a command corresponding to the feedforward steering torque. The MPC optimizer 212 may correspond to the MPC optimizer 122.

In some examples, governing the steering system 106 includes determining a steering torque, $\tau_{cmd}$, to govern (command) a steering actuator 114 to track a reference steering trajectory 118, given by reference steering angle, $\delta_r$; steering rate, $\delta_r$; and/or longitudinal velocity, $v_{x_r}$. The commanded steering torque, $\tau_{cmd}$, may include a component determined by a PID controller and the feedforward steering torque, $x_{ff}$, determined by the predictive model 200 (e.g., by the MPC optimizer 212). For example, the torque transmitted to the steering actuator from the summed predictive model 200 output and PID control output may be represented as $\tau_{cmd} = \tau_{PID} + \tau_{ff}$.

In some examples, the Coulomb friction and desired steering acceleration are not accounted for when computing the feedforward steering torque to avoid inducing high frequency oscillations into the steering control.

Additionally, or alternatively, the MPC optimizer 212 may determine the feedforward steering torque, $x_{ff}$, using a lookup table previously generated for combinations of current states, predicted states, steering angle, steering rate, forward velocity, and/or current controls. Such a lookup table may provide a steering torque required to achieve a steady state steering angle for a given velocity. Data in the lookup table may be generated based on experiments in which the steering torque is adjusted to achieve a desired steering angle for a given forward velocity. For example, such feedforward steering torques for a given reference steering angle and forward velocity may be computed by interpolating the data points from the lookup table. Such interpolation may be linear, for example.

Additionally, or alternatively, where the MPC optimizer 212 may determine the feedforward steering torque, $\tau_{ff}$, by solving an NMPC optimization problem. Such an optimization problem may be set to track a reference trajectory 118 (represented as $\tilde{s}_{0:N}$ for the NMPC optimization discussed below) using the neural network model comprising the neural network block(s) 206 discussed above. In those examples, a longitudinal velocity, $v_x$, may be fixed to be equal to the reference (desired) longitudinal velocity, from planner 102 during the optimization process. One example optimization problem for computing the feedforward steering torque may be written as:

$$\tau^*_{0:N-1} = \operatorname{argmin}_{\tau_{0:N-1}} \sum_{i=1}^{N} (s_i - \tilde{s}_i)^T P_i (s_i - \tilde{s}_i) + \tau_{i-1}^T R_i \tau_{i-1},$$

$$\text{s.t. } x_{i+1} = f_{ph}(z_i) + f_{nn}(z_i),$$

$$s_i = [\delta_i, \dot{\delta}_i]^T,$$

$$\tilde{s}_i = [\delta_r, \dot{\delta}_r]^T$$

$$\text{Given } \{v_{x_{r_{0:N-1}}}, \tilde{x}_{0:N}\}$$

A first component of the optimal steering torque from MPC optimization may be used as a feedforward steering torque ($\tau_{ff} = \tau_0^*$) and summed with an output of the PID controller. Any delays in sending the torque command, the feedforward steering command may correspond to the future stamped steering torque as in $\tau_{ff} = \tau_{delay}^*$.

Various optimization techniques may be employed to optimize the MPC problem described above. In some examples, the MPC optimizer 212 may be configured as a differentially dynamically programmed optimizer that may perform the MPC optimization using a Stage-wise Newton method. In such an example, two steps are repeated until convergence is achieved. In some instances, the steps may comprise a backward pass, which computes a quadratic relaxation of the value function, and forward pass to update the states and controls that minimize the approximated value function. In some examples, the gradient of the cost function with respect to the input variables may be obtained analytically for the neural network model. In additional or alternative examples, the MPC optimizer 212 may perform finite differencing methods to compute gradients of the cost function with respect to the input variables.

Example Vehicle Architecture

Figure 3:
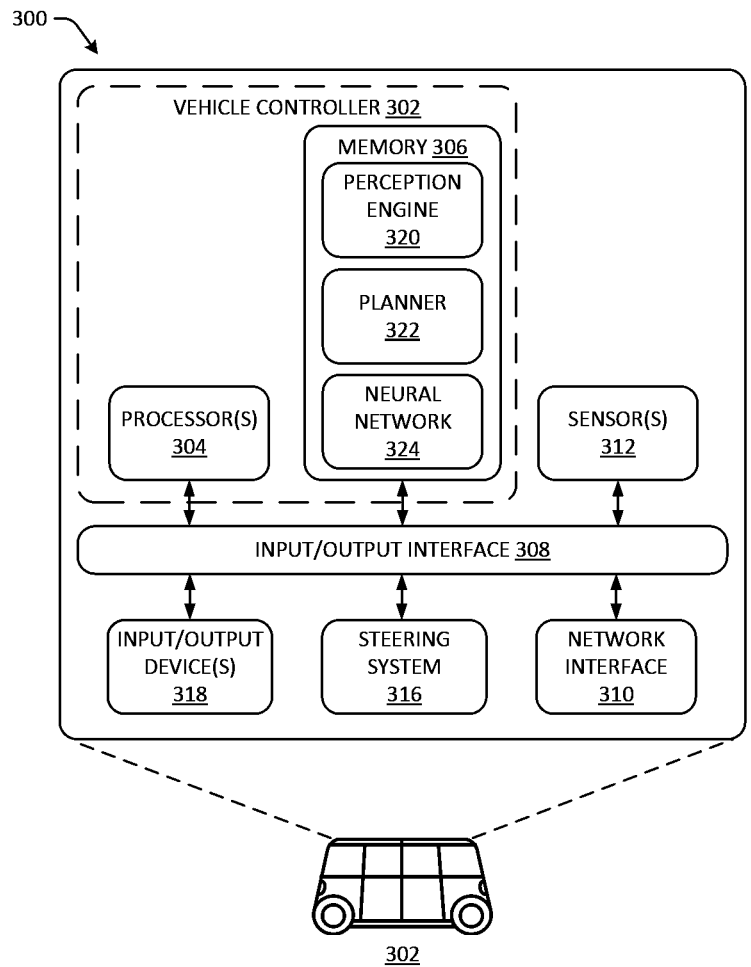
FIG. 3 illustrates a block diagram of an example vehicle architecture for controlling the steering system of at least one autonomous vehicle using the neural network architecture discussed herein.

FIG. 3 is a block diagram of an example architecture 300 including an example vehicle system 302 for controlling the steering system of the vehicle controller 302 according to a reference trajectory produced by a planner of the vehicle system 302, according to the techniques discussed herein. The systems and methods described herein can be implemented in software or hardware or any combination thereof. The systems and methods described herein may be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

In some examples, the vehicle system 302 may represent at least a portion of the vehicle 100. In some examples, the vehicle system 302 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time.

In some examples, the vehicle system 302 may include processor(s) 304 that may include a uniprocessor system including one processor, or a multiprocessor system including several processors (e.g., two, four, eight, or another suitable number). The processor(s) 304 may be any suitable processor capable of executing instructions including, but not limited to, ASIC(s), GPU(s), CPU(s), FPGA(s), etc.

The example vehicle system 302 may include memory 306. In some examples, the memory 306 includes a non-transitory computer readable media configured to store executable instructions/modules, data, and/or data items accessible by the processor(s) 304. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the example vehicle system 302 via an input/output ("I/O") interface 308. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface 310.

In some examples, the I/O interface 308 may be configured to coordinate I/O traffic between the processor(s) 304, the non-transitory computer readable media 306, and the network interface 310, sensor(s) 312, steering system 316 (which may correspond to steering system 106), and/or peripheral devices such as, for example I/O devices 318. In some examples, the I/O devices 318 may include external and/or internal speaker(s), display(s), passenger input device(s), etc. In some examples, the I/O interface 308 may perform any necessary protocol, timing, or other data transformations to convert data signals from one component (e.g., the non-transitory computer readable media) into a format suitable for use by another component (e.g., processor(s)).

The example vehicle system 302 includes sensor(s) 312, for example, configured to sense movement of the example vehicle system 302 through its environment, sense environmental data (e.g., ambient temperature, pressure, and humidity), and/or sense conditions of an interior of the example vehicle system 302 (e.g., passenger count, interior temperature, noise level). In some examples, the sensor(s) 312 may include sensor to detect disaster conditions. The sensor(s) 312 may include, for example, one or more torque sensors, lidar sensors, one or more cameras (e.g., RGB-cameras, intensity (grey scale) cameras, infrared cameras, depth cameras, stereo cameras), one or more magnetometers, one or more radio detection and ranging sensors (RADAR), one or more ultrasonic transducers (e.g. sound navigation and ranging (SONAR)) sensors, one or more microphones for sensing sounds, one or more IMU sensors (e.g., including accelerometers and gyroscopes), one or more GPS sensors, one or more Geiger counter sensors, one or more steering system sensors, and/or other sensors related to the operation of the example vehicle system 302. Other sensors may include, for example, a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system.

The sensors 312 may be configured to provide sensor data representative of torques applied to the steering system, longitudinal and/or lateral velocities, steering angle, steering rate, yaw, etc. and signals to the processor(s) 304 via, for example, the I/O interface 308. Other types of sensors and sensor data are contemplated.

The example vehicle system 302 may also include one or more of a perception engine 320, a planner 322, and a neural network 324.

The perception engine 320 may include instructions stored on memory 306 that, when executed by the processor(s) 304, configure the processor(s) 304 to receive sensor data from the sensor(s) 312 as input, and output data representative of, for example, one or more of the pose (e.g., position and orientation) of an object in the environment surrounding the example vehicle system 302, an object track associated with the object (e.g., a historic position, velocity, acceleration, and/or heading of the object over a period of time (e.g. 5 seconds)), and/or an object classification associated with the object (e.g. a pedestrian, a vehicle, a bicyclist, etc.). In some examples, perception engine 320 may be configured to predict more than an object trajectory of one or more objects. For example, the perception engine 320 may be configured to predict multiple object trajectories based on, for example, probabilistic determinations or multi-modal distributions of predicted positions, trajectories, and/or velocities associated with an object.

The planner 322 may include instructions stored on memory 306 that, when executed by the processor(s) 304, configure the processor(s) 304 to generate data representative of a trajectory of the example vehicle system 302, for example, using data representing a location of the example vehicle system 302 in its environment and other data, such as local pose data. In some examples, the planner 322 may also be configured to determine projected trajectories predicted to be executed by the example vehicle system 302. In some examples, the planner 322 may substantially continuously (e.g., every 1 or 2 milliseconds) generate a plurality of potential trajectories substantially simultaneously (e.g. within technical tolerances) with which to control the example vehicle 302 and select one of the trajectories with which to control the vehicle. The selection may be based at least in part on a current route, a drive mode (e.g., which may be altered by a disaster identification, in some examples), current vehicle trajectory and/or object trajectory data. Upon selecting a trajectory, the planner 322 may transmit the trajectory (e.g., the reference trajectory 118) to the neural network 324 and/or steering system 316 to control the example vehicle system 302 according to the selected (reference) trajectory.

In some examples, the memory 306 may include at least one neural network 324. In an additional or alternate example, the neural network 324 may be received at the example vehicle system 302 via the network interface 310. The neural network 324 may correspond to the predictive model 104 and/or predictive model 200 discussed above. In some examples, the neural network 324 may include a recurrent neural network, a convolutional neural network, or any deep neural network or machine learning algorithm. In some examples, the perception engine 320 further includes instructions stored on memory 306 that, when executed by the processor(s) 304, configure the processor(s) 304 to conduct the operations discussed above in regard to the predictive model 104 and/or 200.

In some examples, the perception engine 320, the planner 322, and/or the neural network 324 may include software and/or hardware. For example, in addition to the instructions composing the neural network 324, the neural network 324 may further include specialized hardware such as, for example, a processor that is suited to running the perception engine (e.g., a graphics processor, an FPGA, etc.).

In one exemplary embodiment, the invention may be directed toward one or more computer systems capable of carrying out the functionality described herein.

Figure 4:
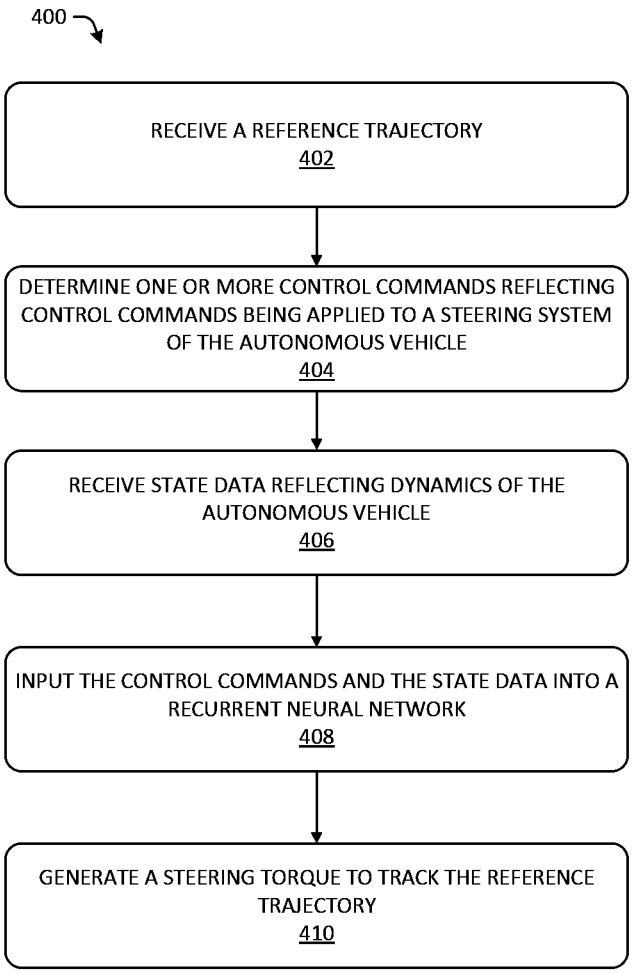
FIG. 4 illustrates a flow diagram of an example process for controlling a steering system of a vehicle using the neural network architecture discussed herein.

FIG. 4 illustrates a flow diagram of an example process 400 for controlling an autonomous vehicle steering system to track a reference trajectory.

At operation 402, the example process 400 may include receiving a reference trajectory, according to any of the techniques discussed herein. In some examples, the reference trajectory may be determined by an MPC optimization that is based at least in part on a trajectory determined by the planner. In some examples, the reference trajectory may be determined by an MPC optimization conducted by the planner or another component.

At operation 404, the example process 400 may include determining one or more control commands reflecting control commands being applied to a steering system of the autonomous vehicle, the control commands configured to cause the autonomous vehicle to follow the reference trajectory, according to any of the techniques discussed herein. In some examples, the control commands may include the current controls 208, $u_i^T$, at a particular time step.

At operation 406, the example process 400 may include receiving state data reflecting dynamics of the autonomous vehicle, according to any of the techniques discussed herein. In some examples, the state data may include the state at a particular time step, $x_i^T$, which may include a predicted state 210 of a previous network block and/or a same network block (recurring an output as an input). In some examples, the state data may be set to correspond to measurements of one or more sensors.

At operation 408, the example process 400 may include inputting the control commands and the state data into a recurrent neural network, according to any of the techniques discussed herein. In some examples, the recurrent neural network may include at least one neural network block comprising a physics model and one or more fully-connected layers, the at least one neural network block being configured to output a predicted state of a steering system of the autonomous vehicle. For example, the neural network block may include one or more of neural network blocks 206(1)-(N) and the predicted state may include predicted state(s) 210.

At operation 410, the example process 400 may include generating a steering torque to track the reference trajectory, based at least in part on the predicted state of the steering system, according to any of the techniques discussed herein. In some examples, the steering torque may be a feedforward steering torque determined by an MPC optimization. For example, the MPC optimization may be an NMPC optimization.

Figure 5A:
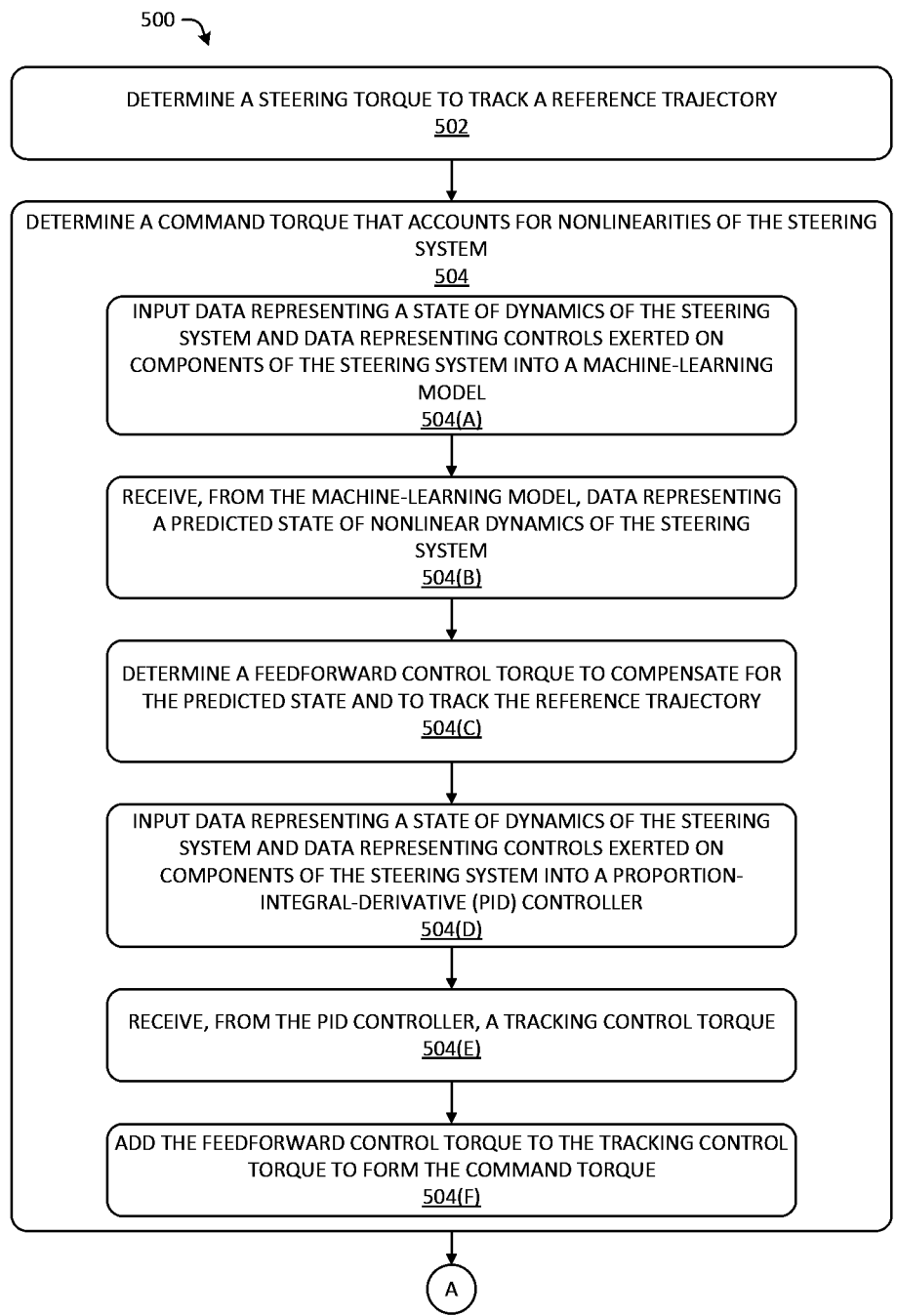
FIGS. 5A and 5B illustrate a flow diagram of an example process for controlling a steering system of a vehicle using the neural network architecture discussed herein.
Figure 5B:
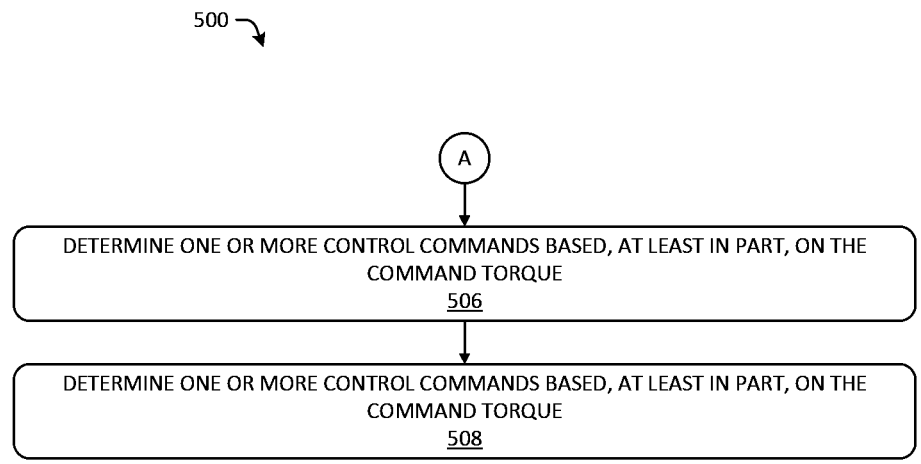

FIG. 5 illustrates a flow diagram of an example process 500 for controlling an autonomous vehicle steering system to track a reference trajectory.

At operation 502, the example process 500 may include determining a steering torque to track a reference trajectory, according to any of the techniques discussed herein.

At operation 504, the example process 500 may include determining a command torque that accounts for nonlinearities of the steering system, according to any of the techniques discussed herein.

At operation 504(A), the example process 500 and operation 504 may additionally or alternatively include inputting data representing a state of dynamics of the steering system and data representing controls exerted on components of the steering system into a machine-learning model, according to any of the techniques discussed herein. In some examples, the machine-learning model may include the predictive model 200. In some examples, the machine-learning model includes a physics function and one or more fully-connected layers.

At operation 504(B), the example process 500 and operation 504 may additionally or alternatively include receiving, from the machine-learning model, data representing a predicted state of nonlinear dynamics of the steering system, according to any of the techniques discussed herein.

At operation 504(C), the example process 500 and operation 504 may additionally or alternatively include determining a feedforward control torque to compensate for the predicted state and to track the reference trajectory, according to any of the techniques discussed herein.

At operation 504(D), the example process 500 and operation 504 may additionally or alternatively may include inputting data representing a state of dynamics of the steering system and data representing controls exerted on components of the steering system into a proportion-integral-derivative (PID) controller, according to any of the techniques discussed herein.

At operation 504(E), the example process 500 and operation 504 may additionally or alternatively may include receiving, from the PID controller, a tracking control torque, according to any of the techniques discussed herein.

At operation 504(F), the example process 500 and operation 504 may additionally or alternatively may include adding the feedforward control torque to the tracking control torque to form the command torque, according to any of the techniques discussed herein.

At operation 506, the example process 500 may include determining one or more control commands based, at least in part, on the command torque, according to any of the techniques discussed herein.

At operation 508, the example process 500 may include transmitting the one or more control commands to a steering actuator, according to any of the techniques discussed herein.

EXAMPLE CLAUSES

A. A non-transitory computer-readable medium storing instructions that, when executed, cause one or more processors to perform operations comprising: receiving a reference trajectory; determining one or more control commands reflecting control commands being applied to a steering system of the autonomous vehicle, the control commands configured to cause the autonomous vehicle to follow the reference trajectory; receiving state data reflecting dynamics of the autonomous vehicle; inputting the control commands and the state data into a recurrent neural network, the recurrent neural network including at least one neural network block comprising a physics function and one or more fully-connected layers, the at least one neural network block being configured to output a predicted state of a steering system of the autonomous vehicle; and generating a steering torque to track the reference trajectory, based at least in part on the predicted state of the steering system.

B. The non-transitory computer-readable medium of paragraph A, wherein the state data is based at least in part on one or more of i) sensor data measured by one or more sensors associated with the autonomous vehicle or ii) a state previously predicted by the recurrent neural network.

C. The non-transitory computer-readable medium of either paragraph A or B, wherein the state data includes an indication of one or more of a steering angle, a steering rate, a yaw, or a lateral velocity of the autonomous vehicle.

D. The non-transitory computer-readable medium of any one of paragraphs A-C, wherein the predicted state comprises a non-linear predicted state, the operations further comprise: determining, at a PID controller, an approximate torque; and combining the approximate torque with the steering torque.

E. The non-transitory computer-readable medium of any one of paragraphs A-D, wherein the number of network blocks is determined based, at least in part, on a time window for a receding horizon.

F. The non-transitory computer-readable medium of any one of paragraphs A-E, wherein the control commands comprise one or more of a torque or a longitudinal velocity.

G. A vehicle comprising: a steering system that includes at least: a steering assembly configured to cause a wheel of the vehicle to vary one or more of a steering angle, a steering rate, or a rotational velocity associated with the wheel; a steering actuator; and a vehicle steering controller; one or more processors; and memory storing instructions that, when executed by the one or more processors, cause the one or more processors to perform operations comprising: receiving a reference trajectory specifying one or more of a desired steering angle, a desired steering rate, or a desired longitudinal velocity; inputting the reference trajectory into a recurrent neural network block that includes a physics function and one or more fully connected layers; receiving, as an output from the recurrent neural network, a predicted state of the steering system; determining a first steering torque based, at least in part, on the predicted state; and transmitting the first steering torque to the vehicle steering controller, the vehicle steering control configured to: receive the first steering torque, convert and the first steering torque to a torque command, and transmit the torque command to the steering actuator, the steering actuator configured to exert a torque on the steering assembly, in response receiving the torque command.

H. The vehicle of paragraph G, wherein the recurrent neural network is trained by a cost function, the cost function comprising a weighted sum of squares of vehicle states, network layer weights, and network layer biases.

I. The vehicle of either paragraph G or H, wherein: converting the first steering torque to a torque command includes combining the first steering torque and a second steering torque determined by a proportional derivative integral (PID) controller; and the steering actuator includes a power steering motor.

J. The vehicle of any one of paragraphs G-I, wherein operations further comprise: determining one or more of an object, an object track, or a predicted object trajectory from sensor data captured by the one or more sensors; and further wherein the reference trajectory is determined based at least in part on the sensor data and the one or more of the object, the object track, or the predicted object trajectory.

K. A method of controlling a steering system of a vehicle comprising: determining a steering torque to track a reference trajectory; determining a command torque that accounts for nonlinearities of the steering system by: inputting data representing a state of dynamics of the steering system and data representing controls exerted on components of the steering system into a machine-learning model that includes a physics function and one or more fully-connected layers; receiving, from the machine-learning model, data representing a predicted state of nonlinear dynamics of the steering system; determining a feedforward control torque to compensate for the predicted state and to track the reference trajectory; inputting data representing a state of dynamics of the steering system and data representing controls exerted on components of the steering system into a proportion-integral-derivative (PID) controller; receiving, from the PID controller, a tracking control torque; and adding the feedforward control torque to the tracking control torque to form the command torque; determining one or more control commands based, at least in part, on the command torque; and transmitting the one or more control commands to a steering actuator.

L. The method of paragraph K, wherein the command torque is a first command torque associated with a first time, the method further comprising: determining a second command torque based at least in part on data associated with the predicted state, the second command torque associated with a second time subsequent to the first time.

M. The method of either paragraph K or L, further comprising exerting a torque, by the steering actuator and based at least in part on the command torque, on a steering assembly to vary one or more of a steering angle, a steering rate, or a rotational velocity of a wheel of the steering system.

N. The method of any one of paragraphs K-M, wherein the machine-learning model is a recurrent neural network including at least a physics function and at one or more fully connected layers.

O. The method of any one of paragraphs K-N, wherein the machine-learning model includes multiple neural network blocks, an individual neural network block of the multiple neural network blocks including the physics function and the one or more fully-connected layers, the number of neural network blocks depending on one or more of a time step or a receding horizon time.

P. The method of any one of paragraphs K-O, wherein: the machine-learned model comprises a recurrent neural network trained by a cost function, the cost function comprising a sum of weighted squares of the state, layer weights, and layer biases, and at least one layer of the one or more layers comprises a hyperbolic tangent.

Q. The method of any one of paragraphs K-P, wherein the sum of weighted squares of the state comprises a diagonal matrix.

R. The method of any one of paragraphs K-Q, wherein the output of the physics function is based at least in part on a model of the dynamics of the steering system, and the predicted state is fed back to the input of the recurrent neural network.

S. The method of any one of paragraphs K-R, wherein a trajectory is output by a planner, and the reference trajectory is determined by a model-prediction-control optimization of the trajectory.

T. The method of any one of paragraphs K-T, wherein: the planner determines one or more of an object, an object track, or a predicted object trajectory from sensor data captured by the one or more sensors; and the reference trajectory is determined based at least in part on the sensor data and the one or more of the object, the object track, or the predicted object trajectory Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

While one or more examples of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   receiving a reference trajectory associated with a vehicle, wherein the vehicle is an autonomous vehicle;
   receiving sensor data from a sensor associated with the vehicle;
   determining, based at least in part on the sensor data and the reference trajectory, vehicle state data comprising one or more of a yaw, a steering rate, a position, an orientation, a speed, or an acceleration of the vehicle;
   determining, based at least in part on the sensor data, the reference trajectory, and the vehicle state data, vehicle control data comprising one or more commands for controlling the vehicle;
   inputting the vehicle state data and the vehicle control data into a first model comprising a neural network modeling a steering system associated with the vehicle;
   inputting the vehicle state data and the vehicle control data into a deterministic and repeatable second model representing a first principle model of the steering system associated with the vehicle;
   determining, based at least in part on a first output from the neural network and a second output from the second model, a predicted vehicle state comprising one or more of a predicted yaw, a predicted steering rate, a predicted position, a predicted orientation, a predicted speed, or a predicted acceleration of the vehicle;
   determining, based at least in part on the predicted vehicle state, a control signal for controlling the vehicle; and
   controlling, based at least in part on the control signal, a steering actuator associated with the steering system to control steering of the vehicle to follow the reference trajectory.

2. The method of claim 1, wherein:
   the neural network and the second model form a neural network block, and
   the first model comprises a plurality of neural network blocks.

3. The method of claim 2, wherein a number of the plurality of neural network blocks is determined based, at least in part, on a time window for a receding horizon.

4. The method of claim 2, wherein the neural network comprises a recurrent neural network.

5. The method of claim 1, wherein the vehicle state data comprises an indication of one or more of a steering angle or a lateral velocity of the vehicle; and
the vehicle state data represent dynamics of the vehicle.

6. The method of claim 1, wherein the second output is based at least in part on a model of steering dynamics of the vehicle.

7. The method of claim 1, wherein the control signal comprises control torque data and the method further comprises:
determining, based at least in part on the control torque data and tracking control torque data, command torque data;
determining, based at least in part on the command torque data, control command data for the steering actuator; and
wherein the steering actuator actuates based at least in part on the control command data.

8. One or more non-transitory computer-readable media storing instructions that, when executed, cause one or more processors to perform operations comprising:
receiving a reference trajectory associated with a vehicle, wherein the vehicle is an autonomous vehicle;
receiving sensor data from a sensor associated with the vehicle;
determining, based at least in part on the sensor data and the reference trajectory, state data comprising one or more of a yaw, a steering rate, a position, an orientation, a speed, or an acceleration of the vehicle;
determining, based at least in part on the sensor data, the reference trajectory, and the state data, control data comprising one or more commands for controlling the vehicle
inputting the state data and the control data into a first model, wherein the first model includes a neural network modeling a steering system of the vehicle, and a deterministic and repeatable second model representing a first principle model of the steering system of the vehicle;
determining, based at least in part on a first output from the neural network and a second output from the second model, a predicted state comprising one or more of a predicted yaw, a predicted steering rate, a predicted location, a predicted orientation, a predicted speed or a predicted acceleration of the vehicle;
determining, based at least in part on the predicted state, a control signal for controlling the vehicle; and
causing, based at least in part on the control signal, a steering actuator associated with the steering system of the vehicle to actuate and assist in controlling steering of the vehicle to follow the reference trajectory.

9. The one or more non-transitory computer-readable media of claim 8, wherein:
the neural network and the second model form a neural network block, and
the first model comprises a plurality of neural network blocks.

10. The one or more non-transitory computer-readable media of claim 9, wherein a number of the plurality of neural network blocks is determined based, at least in part, on a time window for a receding horizon.

11. The one or more non-transitory computer-readable media of claim 9, wherein
the second output is based at least in part on a model of steering motion of the steering system of the vehicle, and
the predicted state is fed back to the neural network.

12. The one or more non-transitory computer-readable media of claim 9, wherein:
the neural network is trained by a cost function comprising a sum of weighted squares of the state data, layer weights, and layer biases, and
at least one layer of the neural network comprises a hyperbolic tangent.

13. The one or more non-transitory computer-readable media of claim 8, wherein the state data includes an indication of one or more of a steering angle, or a lateral velocity of the vehicle.

14. A vehicle comprising:
a steering assembly;
one or more sensors;
one or more processors; and
one or more non-transitory computer-readable media storing instructions that, when executed by the one or more processors, cause the one or more processors to perform operations comprising:
receiving a reference trajectory associated with the vehicle, wherein the vehicle is an autonomous vehicle;
receiving sensor data from the one or more sensors;
determining, based at least in part on the sensor data and the reference trajectory, state data associated with a steering system, the state data comprising one or more of a yaw, a steering rate, a position, an orientation, a speed, or an acceleration of the vehicle;
determining, based at least in part on the sensor data, the reference trajectory, and the state data, control data comprising one or more commands for controlling the vehicle;
inputting the reference trajectory, the state data, and the control data into a first model, the first model comprising a neural network modeling the steering system, and a deterministic and repeatable second model representing a first principle model of the steering system of the vehicle;
determining, based at least in part on a first output from the neural network and a second output from the second model , a predicted state comprising one or more of a predicted yaw, a predicted steering rate, a predicted position, a predicted orientation, a predicted speed, or a predicted acceleration associated with the vehicle;
determining a control signal for controlling the vehicle, based at least in part on the predicted state; and
controlling, based at least in part on the control signal, a steering actuator associated with the steering system to cause the steering actuator to exert a torque on the steering assembly to follow the reference trajectory.

15. The vehicle of claim 14, wherein the one or more commands comprise one or more of a torque or a longitudinal velocity.

16. The vehicle of claim 14, wherein:
the neural network and the second model form a neural network block; and
the first model comprises a plurality of neural network blocks.

17. The vehicle of claim 16, wherein a number of the plurality of neural network blocks is determined based, at least in part, on a time window for a receding horizon.

18. The vehicle of claim 16, wherein the neural network comprises a recurrent neural network, and a number of the plurality of neural network blocks of the recurrent neural network is determined based, at least in part, on a time window for a receding horizon.

19. The vehicle of claim 17, wherein the control signal includes a desired steering torque.

20. The vehicle of claim 17, wherein the neural network is trained by a cost function comprising a sum of weighted squares of the state data, layer weights, and layer biases, and at least one layer of the neural network comprises a hyperbolic tangent.

* * * * *